(12) United States Patent
Platais et al.

(10) Patent No.: US 12,405,990 B2
(45) Date of Patent: Sep. 2, 2025

(54) SYSTEMS AND METHODS FOR FINDING HISTORICALLY SIMILAR INCIDENTS

(71) Applicant: Fidelity Information Services, LLC, Jacksonville, FL (US)

(72) Inventors: John C. Platais, Menomonee Falls, WI (US); Ranadhir Ghosh, St Johns, FL (US)

(73) Assignee: Fidelity Information Services, LLC, Jacksonville, FL (US)

( * ) Notice: Subject to any disclaimer, the term of this patent is extended or adjusted under 35 U.S.C. 154(b) by 0 days.

(21) Appl. No.: 18/492,172

(22) Filed: Oct. 23, 2023

(65) Prior Publication Data

US 2025/0131032 A1   Apr. 24, 2025

(51) Int. Cl.
| | |
|---|---|
| *G06F 16/38* | (2019.01) |
| *G06F 11/07* | (2006.01) |
| *G06F 16/334* | (2025.01) |
| *G06F 16/35* | (2019.01) |

(52) U.S. Cl.
CPC .......... *G06F 16/38* (2019.01); *G06F 11/0793* (2013.01); *G06F 16/3344* (2019.01); *G06F 16/35* (2019.01)

(58) Field of Classification Search
CPC ...... G06F 16/38; G06F 16/35; G06F 16/3344; G06F 11/0793
See application file for complete search history.

(56) References Cited

U.S. PATENT DOCUMENTS

| | | | |
|---|---|---|---|
| 2017/0322959 A1* | 11/2017 | Tidwell | ................. G06F 21/554 |
| 2018/0218734 A1* | 8/2018 | Somech | .................. G10L 15/26 |
| 2023/0098165 A1 | 3/2023 | Shi et al. | |

OTHER PUBLICATIONS

International Search Report of International Application No. PCT/US2024/049240 mailed Jan. 29, 2025, 3 pages.
Xiaofeng Wang et al.: "Automatic Crime Prediction Using Events Extracted from Twitter Posts", Apr. 3, 2012 (Apr. 3, 2012), Social Computing, Behavioral—Cultural Modeling and Prediction, Springer Berlin Heidelberg, Berlin, Heidelberg, pp. 231-238, XP019174636, ISBN: 978-3-642-29046-6.

* cited by examiner

*Primary Examiner* — Truong V Vo
(74) *Attorney, Agent, or Firm* — Bookoff McAndrews, PLLC

(57) ABSTRACT

A method for finding historically similar incidents is disclosed. The method includes receiving a data object indicating an occurrence of a current incident associated with a configurable item, the data object including current incident metadata, the current incident metadata including a configurable item identifier (ID), a configurable item name, and a description of the current incident; receiving a plurality of historical data objects corresponding to a plurality of previous incidents; determining one or more historical data objects, of the plurality of historical data objects, that are similar to the data object based on a comparison of current incident metadata to the previous incident metadata; generating a score for each of the one or more historical data objects based on the comparison of the current incident metadata to the previous incident metadata; and outputting the one or more historical data objects that are similar to the data object to a user.

20 Claims, 11 Drawing Sheets

| NUMBER | CONFIG_CI_NAME | SHORT_DESCRIPTION |
|---|---|---|
| IN22006441108 | EBANKING | EBANKING / CONSUMER EBANKING (CEB) AND EMANAGER INTERMITTENTLY UNAVAILABLE |

| SHORT_DESCRIPTION | CMDB_CI | CONFIG_CI_NAME | DV_U_BUSINESS_SEGMENTS | NUMBER |
|---|---|---|---|---|
| PROD SERVERS ARE GETTING REBOOTED | 19d96650f3782cb80979d8d2754990e73 | EBANKING | CM, BSG | IN22007774784 |
| OLB / ISSUES WITH SOFT TOKEN LOGINS | 19d96650f3782cb80979d8d2754990e73 | EBANKING | BSG | IN22007584469 |
| BUSINESS EBANKING (BEB) AND DIGITAL BUSINESS O... | 19d96650f3782cb80979d8d2754990e73 | EBANKING | BSG | IN22007774784 |

CURRENT CI NAME FOR INCIDENT IN22008505925 :
APP ACB PRD ACB ACBS - CBC

504

| SHORT_DESCRIPTION | CMDB_CI | CONFIG_CI_NAME | DV_U_BUSINESS_SEGMENTS | NUMBER | CI_SIM_SCORE |
|---|---|---|---|---|---|
| ACBS / SINGLE CLIENT ABN AMRO EXPERIENCING APP... | be4c550f1bbd6010fe642f8a234bcb73 | ACBS API | CM | IN22006711454 | 0.62 |
| ACBS / SOME CLIENTS CANNOT ACCESS THE APPLICATION | 3afafcef1bf37894880254ea234bcbe0 | APP ACB PRD ACB ACBS - CIBU | CM | IN22008053380 | 0.88 |

FIG. 5B

{'SHORT_DESCRIPTION': {1254: 'GP4/CP2 - EMEA - SBK - SBK_FRCS BIM IS MISSING THE KPI AS THE L-OVNT-SBK-DA-FFFPPL IS STUCK'}, 'NUMBER': {1254: IN23009032942'}}

506

| | NUMBER | SHORT_DESCRIPTION |
|---|---|---|
| 83 | IN23009304329 | GP4/CP2 - EMEA-SB - SBK_FRCS BIM WAS MISSING T... |
| 69 | IN22008933795 | GP4 / CP2 - EMEA- PMS- SCTI FAILURES |
| 161 | IN22008859716 | GP4/CP2 - EMEA-SB - SBK_PRO_ORIGINS BIM HAS MI... |
| 171 | IN22008852001 | GP4/CP2 - EMEA-SB - BIM FOR SBK_PRO_ORIGINS HA... |
| 41 | IN22009018272 | GP4/CP2 - EMEA- SB - MISSING OUTBOUND CHAPS FILE |
| 26 | IN22008829558 | GP4/CP2 - EMEA - DPP - SLOWNESS IN MEMENTO |
| 93 | IN23009648270 | GP4/CP1 - EMEA - DPP - NO BATCHES IN MEMENTO |

WPG / OBSERVING SOME LATENCY BETWEEN THE EPS BOXES AND THE LUNA EFTS
NUMBER: IN23010039770

|   | NUMBER | SHORT_DESCRIPTION |
|---|---|---|
| 0 | IN22006236974 | CONNECTIVITY ISSUES BETWEEN PDS AND INVESTONE |
| 1 | IN22006157593 | INTERMITTENT LATENCY ISSUES WHILE ON THE PRISM... |
| 2 | IN22007637735 | DPP - CONNECTIVITY ISSUE BETWEEN OUTSEER AND FIS |
| 3 | IN22006831314 | CONNECTIVITY ISSUES IDENTIFIED BETWEEN FIS AND... |
| 4 | IN22006381424 | HW - ELEMENT/ CERTIFICATE ISSUE. CONNECTION BE... |

{'SHORT_DESCRIPTION': {1254: 'GP4/CP2 - EMEA - SBK -
SBK_FRCS BIM IS MISSING THE KPI AS THE L-OVNT-SBK-DA-FFFPFL IS STUCK'},
'NUMBER': {1254: IN23009032942'}}

OUT[3]:

|   | NUMBER | SHORT_DESCRIPTION |
|---|---|---|
| 16 | IN23010253438 | GP4/CP2 - EMEA-SB - SB ARE INCREASING INTERES... |
| 7 | IN23009526133 | GP4/CP2 - EMEA-SB- JOB EXECUTION HAS FAILED ON... |
| 15 | IN22008859716 | GP4/CP2 - EMEA-SB - SBK_PRO_ORIGINS BIM HAS MI... |
| 2 | IN22008837180 | GP4/CP2 - EMEA-SB - 'SAVINGS' / 'FIS' - 'MISSI... |
| 14 | IN22007943839 | EMEA - SBK - JOB EXECUTION HAS FAILED ON 22082... |
| 13 | IN22008465984 | SBK BATCH :- PROFILE MISSED ITS KPI OF 04:30 A... |

| WEIGHT_NAME | WEIGHT_SCORE |
|---|---|
| SIMILAR INCIDENT BY SUMMARY | 40 |
| SAME SYS ID | 10 |
| SIMILAR CI NAME | 5 |
| SIMILAR INCIDENT TYPE | 5 |
| SIMILAR INCIDENT BY KBARTICLE | 40 |

*FIG. 6*

| SHORT_DESCRIPTION | NUMBER | CONFIG_CI_NAME |
|---|---|---|
| MONITOR AND REMOVE FROM THE REPORT ON 10/25. | IN22008505925 | APP ACB PRD ACB ACBS - CBC |

| | NUMBER | CONFIG_CI_NAME | OPENED_AT | SHORT_DESCRIPTION | SIMILARITY_TYPE | FINAL_SCORE_INC |
|---|---|---|---|---|---|---|
| 0 | IN22008312616 | INVSAPAZWBPR1 | 2022-09-30 03:57:50 | MONITOR AND REMOVE FROM THE REPORT ON 10/3. | SIMILAR INCIDENT TYPE | 0.475 |
| 1 | IN22008312616 | INVSAPAZWBPR1 | 2022-09-30 03:57:50 | MONITOR AND REMOVE FROM THE REPORT ON 10/3. | SIMILAR INCIDENT TYPE | 0.475 |
| 2 | IN22008312616 | INVSAPAZWBPR1 | 2022-09-30 03:57:50 | MONITOR AND REMOVE FROM THE REPORT ON 10/3. | SIMILAR INCIDENT BY SUMMARY | 0.475 |
| 3 | IN23010090686 | INVSISRSPR01 | 2023-04-28 14:26:13 | INVESTRAN - USERS UNABLE TO PRODUCE END OF MON... | SIMILAR INCIDENT BY SUMMARY | 0.196 |
| 4 | IN22008923800 | APP DTS PRD WEBFOCUS CLOUD - TRP | 2022-12-16 17:33:46 | BSG/TRP CLIENT CANNOT GET TO THEIR REPORTING P... | SIMILAR INCIDENT BY SUMMARY | 0.196 |
| 5 | IN21005464444 | PROFILE-OTP-BPH | 2021-10-14 01:56:56 | MBP - UNABLE TO RUN END OF DAY REPORTS FOR CLI... | SIMILAR INCIDENT BY SUMMARY | 0.196 |
| 6 | IN22007539438 | SISSTDMSVDT01P | 2022-07-04 08:38:07 | TDMS / LGI CLIENT WAS UNABLE TO GENERATE THE R... | SIMILAR INCIDENT BY SUMMARY | 0.196 |
| 7 | IN22006083969 | BS NAP REPORTING | 2022-01-04 11:38:05 | REPORTS NOT GENERATED ON ORACLE FOR 01/01/22 | SIMILAR INCIDENT BY SUMMARY | 0.188 |

FIG. 7

SYSTEMS AND METHODS FOR FINDING HISTORICALLY SIMILAR INCIDENTS

TECHNICAL FIELD

The present disclosure relates generally to information technology (IT) management systems and, more particularly, to systems and methods for determining historically similar incidents that occur within such systems.

BACKGROUND

In computing systems, for example computing systems that perform financial services and electronic payment transactions, programing changes may occur. For example, software may be updated. Changes in the system may lead to incidents, defects, issues, bugs or problems (collectively referred to as incidents) within the system. These incidents may occur at the time of a software change or at a later time. These incidents may be costly for the company as users may not be able to use the services and due to resources expended by the company to resolve the incidents.

These incidents in the system may need to be examined and resolved in order to have the software services perform correctly. Time may be spent by, for example, incident resolution teams, determining what issues arose within the software services. The faster an incident may be resolved, the less potential costs a company may incur. Thus, promptly identifying and fixing such incidents (e.g., writing new code or updating deployed code) may be important to a company.

Incidents within a system may be related and may repeat themselves from time to time. Identifying a previous incident that was similar to a current incident may lead to an incident being resolved more quickly (e.g., updates performed by the previous issue may be utilized to address the new issue). Many existing computing systems do not have the ability to find historically similar incidents in order to analyze new incidents. The present disclosure is directed to addressing this and other drawbacks to the existing computing system incident analysis.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

In some aspects, the techniques described herein relate to a computer-implemented method for finding historically similar incidents in a system, the method including: receiving a data object indicating an occurrence of a current incident associated with a configurable item, the data object including current incident metadata, the current incident metadata including a configurable item identifier (ID), a configurable item name, and a description of the current incident; receiving a plurality of historical data objects corresponding to a plurality of previous incidents, each of the plurality of historical data objects indicating an occurrence of a previous incident and including previous incident metadata, the previous incident metadata including a configurable item ID, a configurable item name, and a description of the previous incident; determining one or more historical data objects, of the plurality of historical data objects, that are similar to the data object based on a comparison of the current incident metadata to the previous incident metadata; generating a score for each of the one or more historical data objects based on the comparison of the current incident metadata to the previous incident metadata; and outputting the one or more historical data objects that are similar to the data object to a user via a graphical user interface (GUI).

In some aspects, the techniques described herein relate to a method, wherein determining the one or more historical data objects further includes applying a natural language processing algorithm to the data object and the plurality of historical data objects.

In some aspects, the techniques described herein relate to a method, wherein the plurality of historical data objects are received during a pre-determined time period.

In some aspects, the techniques described herein relate to a method, further including extracting a knowledge based (KB) article and a topic from each of the descriptions of the current and previous incidents using a natural language processing module.

In some aspects, the techniques described herein relate to a method wherein the natural language processing module utilizes a linear discriminant analysis algorithm or Gibbs sampling dirichlet mixture model algorithm to extract the topic.

In some aspects, the techniques described herein relate to a method, wherein generating the score for each of the one or more historical data objects includes: determining a first list of historical data objects based on a similarity between the configurable item ID of the current incident and the configurable item ID of each of the previous incidents; determining a second list of historical data objects based on a similarity between the configurable item name of the current incident and the configurable item name of each of the previous incidents; determining a third list of historical data objects based on a similarity between the topic of the current incident and the topic of each of the previous incidents; and determining a fourth list of historical data objects based on a similarity between the KB article of the current incident and the KB article of each of the previous incidents.

In some aspects, the techniques described herein relate to a method, wherein generating the score for each of the one or more historical data objects further includes: assigning one or more initial scores to each of the one or more historical data objects based on whether the historical data object was determined to be in the first list, second list, third list, and/or fourth list.

In some aspects, the techniques described herein relate to a method, wherein generating the score for each of the one or more historical data objects further includes: assigning a weighted average score to each of the one or more historical data objects, wherein the weighted average score is an initial score if the historical data object is only in one of the first list, second list, third list, and fourth list and the weighted average score is based on a combination of initial scores when the historical data object is in two or more of the first list, second list, third list, and fourth list, the weighted average score being the score generated for each of the one or more historical data objects.

In some aspects, the techniques described herein relate to a method, wherein the one or more historical data objects are included in a ranked list that combines the first list, second list, third list, and fourth list, and orders the one or more historical data objects based on the respective one or more weighted average scores.

In some aspects, the techniques described herein relate to a system for finding historically similar incidents in a system, the system including: a memory having processor-readable instructions stored therein; and at least one processor configured to access the memory and execute the processor-readable instructions to perform operations including: receiving a data object indicating an occurrence of a current incident associated with a configurable item, the data object including current incident metadata, the current incident metadata including a configurable item identifier (ID), a configurable item name, and a description of the current incident; receiving a plurality of historical data objects corresponding to a plurality of previous incidents, each of the plurality of historical data objects indicating an occurrence of a previous incident and including previous incident metadata, the previous incident metadata including a configurable item ID, a configurable item name, and a description of the previous incident; determining one or more historical data objects, of the plurality of historical data objects, that are similar to the data object based on a comparison of the current incident metadata to the previous incident metadata; generating a score for each of the one or more historical data objects based on the comparison of the current incident metadata to the previous incident metadata; and outputting the one or more historical data objects that are similar to the data object to a user via a graphical user interface (GUI).

In some aspects, the techniques described herein relate to a system, wherein determining the one or more historical data objects further includes applying a natural language processing algorithm to the data object and the plurality of historical data objects.

In some aspects, the techniques described herein relate to a system, wherein the plurality of historical data objects are received during a pre-determined time period.

In some aspects, the techniques described herein relate to a system, the operations further including: extracting a knowledge based (KB) article and a topic from each of the descriptions of the current and previous incidents using a natural language processing module.

In some aspects, the techniques described herein relate to a system, wherein the natural language processing module utilizes a linear discriminant analysis algorithm or Gibbs sampling dirichlet mixture model algorithm to extract the topic.

In some aspects, the techniques described herein relate to a system, wherein generating the score for each of the one or more historical data objects includes: determining a first list of historical data objects based on a similarity between the configurable item ID of the current incident and the configurable item ID of each of the previous incidents; determining a second list of historical data objects based on a similarity between the configurable item name of the current incident and the configurable item name of each of the previous incidents; determining a third list of historical data objects based on a similarity between the topic of the current incident and the topic of each of the previous incidents; and determining a fourth list of historical data objects based on a similarity between the KB article of the current incident and the KB article of each of the previous incidents.

In some aspects, the techniques described herein relate to a system, wherein generating the score for each of the one or more historical data objects further includes: assigning one or more initial scores to each of the one or more historical data objects based on whether the historical data object was determined to be in the first list, second list, third list, and/or fourth list.

In some aspects, the techniques described herein relate to a system, wherein generating the score for each of the one or more historical data objects further includes: assigning a weighted average score to each of the one or more historical data objects, wherein the weighted average score is an initial score if the historical data object is only in one of the first list, second list, third list, and fourth list and the weighted average score is based on a combination of initial scores when the historical data object is in two or more of the first list, second list, third list, and fourth list, the weighted average score being the score generated for each of the one or more historical data objects.

In some aspects, the techniques described herein relate to a system, wherein the one or more historical data objects are included in a ranked list that combines the first list, second list, third list, and fourth list, and orders the one or more historical data objects based on the respective one or more weighted average scores.

In some aspects, the techniques described herein relate to a non-transitory computer readable medium storing processor-readable instructions which, when executed by at least one processor, cause the at least one processor to perform operations including: receiving a data object indicating an occurrence of a current incident associated with a configurable item, the data object including current incident metadata, the current incident metadata including a configurable item identifier (ID), a configurable item name, and a description of the current incident; receiving a plurality of historical data objects corresponding to a plurality of previous incidents, each of the plurality of historical data objects indicating an occurrence of a previous incident and including previous incident metadata, the previous incident metadata including a configurable item ID, a configurable item name, and a description of the previous incident; determining one or more historical data objects, of the plurality of historical data objects, that are similar to the data object based on a comparison of the current incident metadata to the previous incident metadata; generating a score for each of the one or more historical data objects based on the comparison of the current incident metadata to the previous incident metadata; and outputting the one or more historical data objects that are similar to the data object to a user via a graphical user interface (GUI).

In some aspects, the techniques described herein relate to a non-transitory computer readable medium, wherein determining the one or more historical data objects further includes applying a natural language processing algorithm to the data object and the plurality of historical data objects.

BRIEF DESCRIPTION OF THE DRAWINGS

The accompanying drawings, which are incorporated in and constitute a part of this specification, illustrate several embodiments and together with the description, serve to explain the principles of the disclosure.

FIG. 5A depicts an exemplary table output from a same Configurable Item (CI) module, according to one or more embodiments.

FIG. 5B depicts an exemplary table output from a similar Configurable Item (CI) module, according to one or more embodiments.

FIG. 5C depicts an exemplary table output from a similar topic module, according to one or more embodiments.

FIG. 5D depicts another exemplary table output from a similar topic module, according to one or more embodiments.

FIG. 5E depicts an exemplary table output from a Knowledge Based (KB) article module, according to one or more embodiments.

FIG. 6 depicts an exemplary table of weighted scores output from an all similarity type module, according to one or more embodiments.

FIG. 7 depicts an exemplary table output from an all similarity type module, according to one or more embodiments.

DETAILED DESCRIPTION OF EMBODIMENTS

Figure 1:
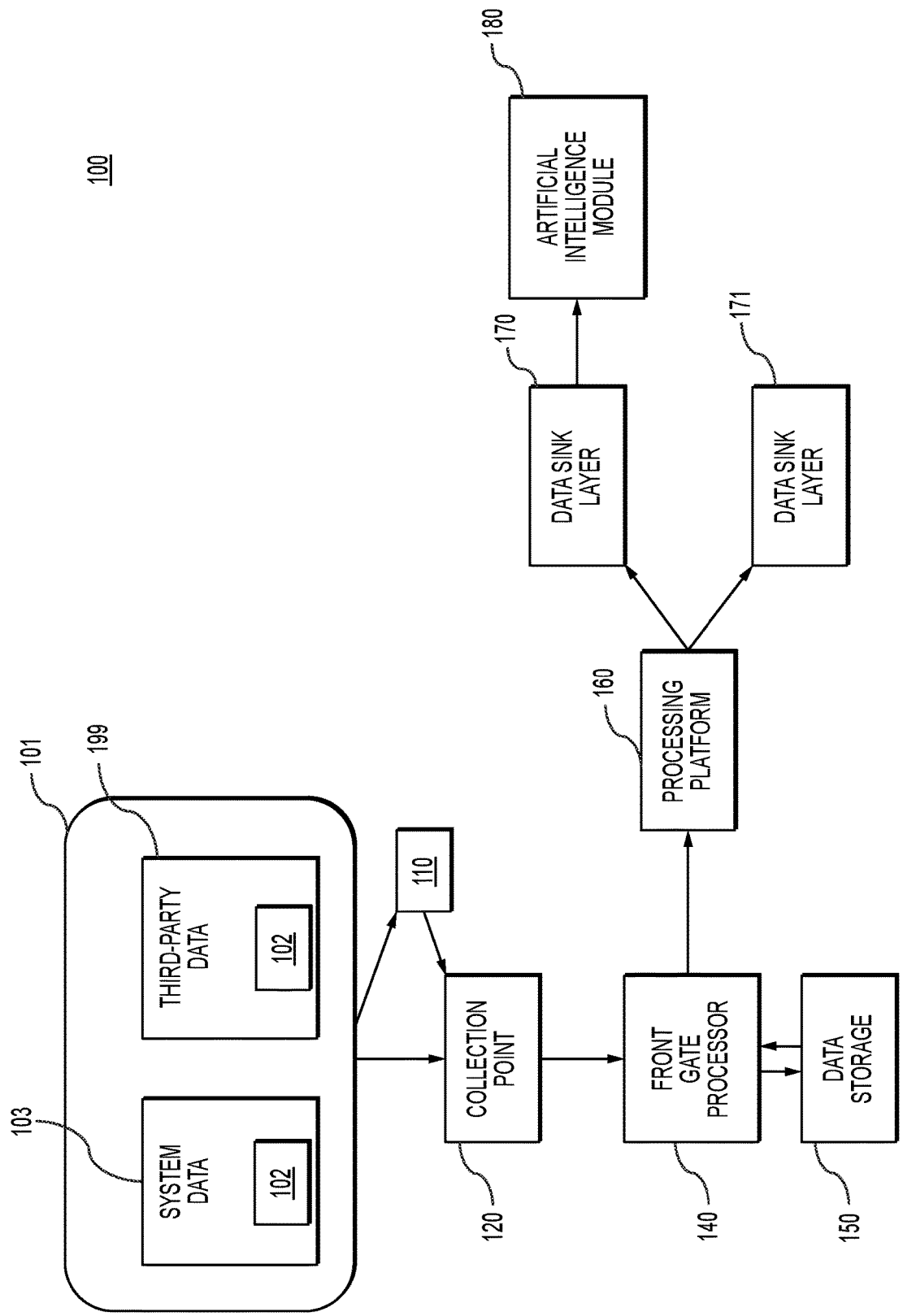
FIG. 1 depicts an exemplary system overview for a data pipeline for an artificial intelligence model to predict and troubleshoot incidents in a system, according to one or more embodiments.

The present disclosure relates generally to the field of software testing, and, more particularly, to systems and methods for finding historically similar incidents.

The subject matter of the present disclosure will now be described more fully with reference to the accompanying drawings that show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter may be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

The present disclosure relates generally to information technology (IT) management systems and, more particularly, to systems and methods for determining historically similar incidents.

Software companies have been struggling to avoid outages from incidents that may be caused while upgrading software or hardware components, or changing a member of a team, for example. An incident may be an occurrence that can disrupt or cause a loss of operation, services, or functions of a system.

For example, an information technology (IT) management system may receive incidents (e.g., data objects indicating occurrences of incidents) at invariable rates throughout the day. When incidents are received, it may be unclear as to how a particular incident relates to previous incidents. Better understanding the relationship between received incidents, in comparison to similar past incidents, may assist a user or a system in identifying and potentially addressing incidents for a system.

Processing a vast amount of information, such as incidents, to produce meaningful and actionable insights in information technology IT operations may be valuable to organizations. As IT management systems utilize sophisticated tools and sensors, billions of data points may be received and information overload may become an issue to be resolved. The systems and methods described herein may enable identification of historically similar incidents to provide additional insights. The historically similar incidents may help a user to better understand the relationships between various incidents and may provide insights into potential solutions.

As discussed above, identifying and resolving current incidents in a system may be crucial to fixing and/or most efficiently running a system. Identifying and analyzing solutions to similar incidents may assist a user and/or system in determining a solution to a current incident. Current systems may not be capable of accurately and efficiently finding similar historical incidents.

To address this system, the above-noted problem the present disclosure describes systems and methods described herein may utilize Natural Language Processing modeling to determine historically similar incidents. One or more embodiments include a system that may determine and record the following attributes from previous incidents and their corresponding configurable items: configurable item ID, configurable item name, summary topics, and knowledge based (KB) article. In some examples, additional attributes such as issue type and cluster type may be extracted from an incident. These attributes may be determined by applying a fuzzy keyword algorithm to a corresponding description for an incident. The system may then, compare the configurable item ID, configurable item name, summary topics, and KB article of a newly received incident to corresponding data of all previous incidents to find historically similar incidents. The system and methods may for example apply a weighted average to the received attributes in order to prepare a ranked list of historical incidents determined to be most similar to the received incident. The system and methods may utilize natural process language models to determine the list. The system may further be configured to determine a ranked similarity list for each of the received metadata list (e.g., for the ID, name, summary topics, and KB article). The system may further determine a combined list of historically similar incidents based on the received metadata.

FIG. 1 depicts an exemplary system overview for a data pipeline for an artificial intelligence model to predict and troubleshoot incidents in a system, according to one or more embodiments. The data pipeline system 100 may be a platform with multiple interconnected components. The data pipeline system 100 may include one or more servers, intelligent networking devices, computing devices, components, and corresponding software for aggregating and processing data.

As shown in FIG. 1, a data pipeline system 100 may include a data source 101, a collection point 120, a secondary collection point 110, a front gate processor 140, data storage 150, a processing platform 160, a data sink layer 170, a data sink layer 171, and an artificial intelligence module 180.

The data source 101 may include in-house data 103 and third party data 199. The in-house data 103 may be a data source directly linked to the data pipeline system 100. Third party data 199 may be a data source connected to the data pipeline system 100 externally as will be described in greater detail below.

Both the in-house data 103 and third party data 199 of the data source 101 may include incident data 102. Incident data 102 may include incident reports with information for each incident provided with one or more of an incident number, closed date/time, category, close code, close note, long description, short description, root cause, or assignment group. Incident data 102 may include incident reports with information for each incident provided with one or more of an issue key, description, summary, label, issue type, fix version, environment, author, or comments. Incident data 102 may include incident reports with information for each incident provided with one or more of a file name, script name, script type, script description, display identifier, message, committer type, committer link, properties, file changes, or branch information. Incident data 102 may include one or more of real-time data, market data, performance data, historical data, utilization data, infrastructure data, or security data. These are merely examples of information that may be used as data, and the disclosure is not limited to these examples.

Incident data 102 may be generated automatically by monitoring tools that generate alerts and incident data to provide notification of high-risk actions, failures in IT environment, and may be generated as tickets. Incident data may include metadata, such as, for example, text fields, identifying codes, and time stamps.

The in-house data 103 may be stored in a relational database including an incident table. The incident table may be provided as one or more tables, and may include, for example, one or more of problems, tasks, risk conditions, incidents, or changes. The relational database may be stored in a cloud. The relational database may be connected through encryption to a gateway. The relational database may send and receive periodic updates to and from the cloud. The cloud may be a remote cloud service, a local service, or any combination thereof. The cloud may include a gateway connected to a processing API configured to transfer data to the collection point 120 or a secondary collection point 110. The incident table may include incident data 102.

Data pipeline system 100 may include third party data 199 generated and maintained by third party data producers.

Third party data producers may produce incident data 102 from Internet of Things (IoT) devices, desktop-level devices, and sensors. Third party data producers may include but are not limited to Tryambak, Appneta, Oracle, Prognosis, ThousandEyes, Zabbix, ServiceNow, Density, Dyatrace, etc. The incident data 102 may include metadata indicating that the data belongs to a particular client or associated system.

The data pipeline system 100 may include a secondary collection point 110 to collect and pre-process incident data 102 from the data source 101. The secondary collection point 110 may be utilized prior to transferring data to a collection point 120. The secondary collection point 110 point may for example be an Apache Minifi software. In one example, the secondary collection point 110 may run on a microprocessor for a third party data producer. Each third party data producer may have an instance of the secondary collection point 110 running on a microprocessor. The secondary collection point 110 may support data formats including but not limited to JSON, CSV, Avro, ORC, HTML, XML, and Parquet. The secondary collection point 110 may encrypt incident data 102 collected from the third party data producers. The secondary collection point 110 may encrypt incident data, including, but not limited to, Mutual Authentication Transport Layer Security (mTLS), HTTPs, SSH, PGP, IPsec, and SSL. The secondary collection point 110 may perform initial transformation or processing of incident data 102. The secondary collection point 110 may be configured to collect data from a variety of protocols, have data provenance generated immediately, apply transformations and encryptions on the data, and prioritize data.

The data pipeline system 100 may include a collection point 120. The collection point 120 may be a system configured to provide a secure framework for routing, transforming, and delivering data across from the data source 101 to downstream processing devices (e.g., the front gate processor 140). The collection point 120 may for example be a software such as Apache NiFi. The collection point 120 may receive raw data and the data's corresponding fields such as the source name and ingestion time. The collection point 120 may run on a Linux Virtual Machine (VM) on a remote server. The collection point 120 may include one or more nodes. For example, the collection point 120 may receive incident data 102 directly from the data source 101. In another example, the collection point 120 may receive incident data 102 from the secondary collection point 110. The secondary collection point 110 may transfer the incident data 102 to the collection point 120 using, for example, Site-to-Site protocol. The collection point 120 may include a flow algorithm. The flow algorithm may connect different processors, as described herein, to transfer and modify data from one source to another. For each third party data producer, the collection point 120 may have a separate flow algorithm. Each flow algorithm may include a processing group. The processing group may include one or more processors. The one or more processors may, for example, fetch incident data 102 from the relational database. The one or more processors may utilize the processing API of the in-house data 103 to make an API call to a relational database to fetch incident data 102 from the incident table. The one or more processors may further transfer incident data 102 to a destination system such as a front gate processor 140. The collection point 120 may encrypt data through HTTPS, Mutual Authentication Transport Layer Security (mTLS), SSH, PGP, IPsec, and/or SSL, etc. The collection point 120 may support data formats including but not limited to JSON, CSV, Avro, ORC, HTML, XML, and Parquet. The collection point 120 may be configured to write messages to clusters of a front gate processor 140 and communication with the front gate processor 140.

The data pipeline system 100 may include a distributed event streaming platform such as a front gate processor 140. The front gate processor 140 may be connected to and configured to receive data from the collection point 120. The front gate processor 140 may be implemented in an Apache Kafka cluster software system. The front gate processor 140 may include one or more message brokers and corresponding nodes. The message broker may for example be an intermediary computer program module that translates a message from the formal messaging protocol of the sender to the formal messaging protocol of the receiver. The message broker may be on a single node in the front gate processor 140. A message broker of the front gate processor 140 may run on a virtual machine (VM) on a remote server. The collection point 120 may send the incident data 102 to one or more of the message brokers of the front gate processor 140. Each message broker may include a topic to store similar categories of incident data 102. A topic may be an ordered log of events. Each topic may include one or more sub-topics. For example, one sub-topic may store incident data 102 relating to network problems and another topic may store incident data 102 related to security breaches from third party data producers. Each topic may further include one or more partitions. The partitions may be a systematic way of breaking the one topic log file into many logs, each of which can be hosted on a separate server. Each partition may be configured to store as much as a byte of incident data 102. Each topic may be partitioned evenly between one or more message brokers to achieve load balancing and scalability. The front gate processor 140 may be configured to categorize the received data into a plurality of client categories, thereby forming a plurality of datasets associated with the respective client categories. These datasets may be stored separately within the storage device as described in greater detail below. The front gate processor 140 may further transfer data to storage and to processors for further processing.

For example, the front gate processor 140 may be configured to assign particular data to a corresponding topic. Alert sources may be assigned to an alert topic, and incident data may be assigned to an incident topic. Change data may be assigned to a change topic. Problem data may be assigned to a problem topic.

The data pipeline system 100 may include a software framework for data storage 150. The data storage 150 may be configured for long term storage and distributed processing. The data storage 150 may be implemented using, for example, Apache Hadoop. The data storage 150 may store incident data 102 transferred from the front gate processor 140. In particular, data storage 150 may be utilized for distributed processing of incident data 102, and Hadoop distributed file system (HDFS) within the data storage may be used for organizing communications and storage of incident data 102. For example, the HDFS may replicate any node from the front gate processor 140. This replication may protect against hardware or software failures of the front gate processor 140. The processing may be performed in parallel on multiple servers simultaneously.

The data storage 150 may include an HDFS that is configured to receive the metadata (e.g., incident data). The data storage 150 may further process the data utilizing a MapReduce algorithm. The MapReduce algorithm may allow for parallel processing of large data sets. The data storage 150 may further aggregate and store the data utilizing Yet Another Resource Negotiation (YARN). YARN may be used for cluster resource management and planning tasks of the stored data. For example, a cluster computing framework, such as the processing platform 160, may be arranged to further utilize the HDFS of the data storage 150. For example, if the data source 101 stops providing data, the processing platform 160 may be configured to retrieve data from the data storage 150 either directly or through the front gate processor 140. The data storage 150 may allow for the distributed processing of large data sets across clusters of computers using programming models. The data storage 150 may include a master node and an HDFS for distributing processing across a plurality of data nodes. The master node may store metadata such as the number of blocks and their locations. The main node may maintain the file system namespace and regulate client access to said files. The main node may comprise files and directories and perform file system executions such as naming, closing, and opening files. The data storage 150 may scale up from a single server to thousands of machines, each offering local computation and storage. The data storage 150 may be configured to store the incident data in an unstructured, semi-structured, or structured form. In one example, the plurality of datasets associated with the respective client categories may be stored separately. The master node may store the metadata such as the separate dataset locations.

The data pipeline system 100 may include a real-time processing framework, e.g., a processing platform 160. In one example, the processing platform 160 may be a distributed dataflow engine that does not have its own storage layer. For example, this may be the software platform Apache Flink. In another example, the software platform Apache Spark may be utilized. The processing platform 160 may support stream processing and batch processing. Stream processing may be a type of data processing that performs continuous, real-time analysis of received data. Batch processing may involve receiving discrete data sets processed in batches. The processing platform 160 may include one or more nodes. The processing platform 160 may aggregate incident data 102 (e.g., incident data 102 that has been processed by the front gate processor 140) received from the front gate processor 140. The processing platform 160 may include one or more operators to transform and process the received data. For example, a single operator may filter the incident data 102 and then connect to another operator to perform further data transformation. The processing platform 160 may process incident data 102 in parallel. A single operator may be on a single node within the processing platform 160. The processing platform 160 may be configured to filter and only send particular processed data to a particular data sink layer. For example, depending on the data source of the incident data 102 (e.g., whether the data is in-house data 103 or third party data 199), the data may be transferred to a separate data sink layer (e.g., data sink layer 170, or data sink layer 171). Further, additional data that is not required at downstream modules (e.g., at the artificial intelligence module 180) may be filtered and excluded prior to transferring the data to a data sink layer.

The processing platform 160 may perform three functions. First, the processing platform 160 may perform data validation. The data's value, structure, and/or format may be matched with the schema of the destination (e.g., the data sink layer 170). Second, the processing platform 160 may perform a data transformation. For example, a source field, target field, function, and parameter from the data may be extracted. Based upon the extracted function of the data, a particular transformation may be applied. The transformation may reformat the data for a particular use downstream. A user may be able to select a particular format for downstream use. Third, the processing platform 160 may perform data routing. For example, the processing platform 160 may select the shortest and/or most reliable path to send data to a respective sink layer (e.g., sink layer 170 and/or sink layer 171).

In one example, the processing platform 160 may be configured to transfer particular sets of data to a data sink layer. For example, the processing platform 160 may receive input variables for a particular artificial intelligence module 180. The processing platform 160 may then filter the data received from the front gate processor 140 and only transfer data related to the input variables of the artificial intelligence module 180 to a data sink layer.

The data pipeline system 100 may include one or more data sink layers (e.g., data sink layer 170 and data sink layer 171). Incident data 102 processed from processing platform 160 may be transmitted to and stored in data sink layer 170. In one example, the data sink layer 171 may be stored externally on a particular client's server. The data sink layer 170 and data sink layer 171 may be implemented using a software such as, but not limited to, PostgreSQL, HIVE, Kafka, OpenSearch, and Neo4j. The data sink layer 170 may receive in-house data 103, which have been processed and received from the processing platform 160. The data sink layer 171 may receive third party data 199, which have been processed and received from the processing platform 160. The data sink layers may be configured to transfer incident data 102 to an artificial intelligence module 180. The data sink layers may be data lakes, data warehouses, or cloud storage systems. Each data sink layer may be configured to store incident data 102 in both a structured or unstructured format. Data sink layer 170 may store incident data 102 with several different formats. For example, data sink layer 170 may support data formats such as JavaScript Objection Notation (JSON), comma-separated value (CSV), Avro, Optimized Row Columnar (ORC), Hypertext Markup Language (HTML), Extensible Markup Language (XML), or Parquet, etc. The data sink layer (e.g., data sink layer 170 or data sink layer 171), may be accessed by one or more separate components. For example, the data sink layer may be accessed by a Non-structured Query language ("NoSQL") database management system (e.g., a Cassandra cluster), a graph database management system (e.g., Neo4j cluster), further processing programs (e.g., Kafka+Flink programs), and a relation database management system (e.g., postgres cluster). Further processing may thus be performed prior to the processed data being received by an artificial intelligence module 180.

The data pipeline system 100 may include an artificial intelligence module 180. The artificial intelligence module 180 may include a machine-learning component. The artificial intelligence module 180 may use the received data in order to train and/or use a machine learning model. The machine learning model may be, for example, a neural network. Nonetheless, it should be noted that other machine learning techniques and frameworks may be used by the artificial intelligence module 180 to perform the methods contemplated by the present disclosure. For example, the systems and methods may be realized using other types of supervised and unsupervised machine learning techniques such as regression problems, random forest, cluster algorithms, principal component analysis (PCA), reinforcement learning, or a combination thereof. The artificial intelligence module 180 may be configured to extract and receive data from the data sink layer 170.

Figure 2:
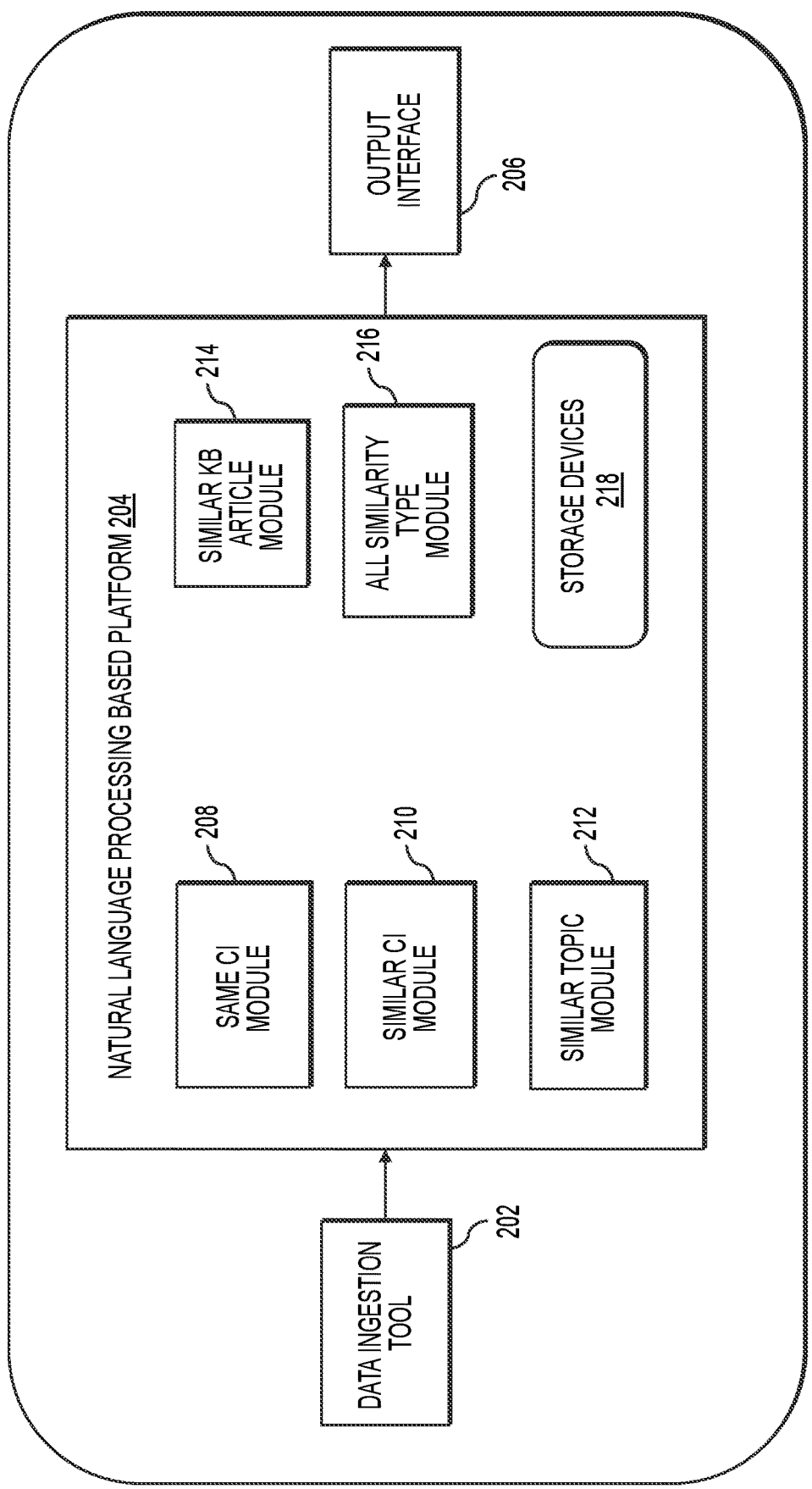
FIG. 2 depicts an exemplary block diagram of a system for determining historically similar incidents, according to one or more embodiments.

FIG. 2 depicts an exemplary block diagram of a system 200 for determining historically similar incidents, according to one or more embodiments. The system 200 may include a data ingestion tool 202, a natural language processing based platform 204, and an output interface 206. As will be described in more detail below, the system 200 may be utilized to receive an incident (e.g., a data object indicating an occurrence of an incident) and corresponding metadata as input and to output a list of historically similar incidents (e.g., a list of historical data objects indicating occurrences of previous incidents). The system 200 may be implemented by aspects of the data pipeline system 100 of FIG. 1 or by any computer processing system such as device 900.

The system 200 may include a data ingestion tool 202. The data ingestion tool 202 may refer to a process and system for facilitating a transfer of the incident and incident data (e.g., data objects containing data related to the incidents) to the various tools, modules, components, and devices that are used for determining historically similar incidents, according to an exemplary embodiment. The data ingestion tool 202 may be configured to receive metadata of historical (e.g., previous) and current incidents. For example, the data ingestion tool 202 may include an application programming interface (API) configured to receive incident data (both historical and current incident data) may include incident reports with information for each incident provided with one or more of an incident number, closed date/time, category, close code, close note, long description, short description, root cause, or assignment group. Incident data may include incident reports with information for each incident provided with one or more of an issue key, description, summary, label, issue type, fix version, environment, author, or comments. Incident data may include incident reports with information for each incident provided with one or more of a file name, script name, script type, script description, display identifier, message, committer type, committer link, properties, file changes, or branch information. Incident data may include one or more of real-time data, market data, performance data, historical data, utilization data, infrastructure data, or security data. The incident data may also include information as to which configurable item had the particular incident. For example, within incident reports and configurable item metadata may be the following attributes: configuration management database configuration item (CMBDB_CI) ID (also referred to as a sys_ID), a CMDB_CI name, a description (of which a topic may be determined), and associated knowledge base (KB) article with each incident. In some examples, a single incident may include one or more configurable items attached to a single incident. These are merely examples of information that may be used as data, and the disclosure is not limited to these examples.

The CMDB_CI ID may be an identification for a particular configurable item within a database. The CMDB_CI name may be a name used to describe a particular configurable item within a database. A topic may be a term that describes a subject matter of an incident. The topic for an incident may be generated by an algorithm as discussed further below. A knowledge based article is a documentation that provides articles, FAQs, guidelines, or trouble shooting suggestions for a particular incident. The knowledge based article may be inputted manually for a particular incident.

The incident data received at data ingestion tool 202 may be for example from the data sink layer 170 of FIG. 1. The data ingestion tool 202 may for example extract the attributes from a configuration management database (CMDB) that may be located within the data sink layer 170. The data ingestion tool 202 may further extract data from a configuration master table. The data received by the data ingestion tool 202 may have previously been processed and filtered to only provide incident data. The data may further have been filtered to provide incident of a particular external systems. In another example, the incident data may be received by an electronic network, such as the Internet, through one or more computers, servers, and/or handheld mobile devices. The electronic network may be connected so as to provide incident data generated automatically by an external system by monitoring tools that generate alerts and incident data to provide notification of high-risk actions, failures in IT environment, and may be generated as tickets.

The system 200 may further include a natural language processing based platform 204. In one example, the natural language processing based platform 204 or components of the natural language processing based platform 204 may be implemented by the artificial intelligence module 180. The natural language processing based platform 204 may be configured to receive new incident data (e.g., via the data ingestion tool 202) and to utilize each of its components (e.g., same Configurable Item (CI) module 208, the similar Configurable Item (CI) module 210, the similar topic module 212, the similar Knowledge Based (KB) article module 214, and the all similarity type module 216) to determine a list of historically similar incidents that may be saved and then output (e.g., via a output interface 206). The natural language processing based platform 204 may further include one or more storage devices 218. The one or more storage devices 218 may be configured to store historical incident data, new incident data, as well as determined lists of historically similar incident data.

The natural language processing based platform 204 may further include server systems. The server systems may also include processing devices for processing data stored in the one or more storage devices 218. Server systems may further include one or more machine learning tool(s) or capabilities (e.g., implemented by the same CI module 208, the similar CI module 210, the similar topic module 212, the similar KB article module 214, and the all similarity type module 216).

In one example, one or more of the same CI module 208, the similar CI module 210, the similar topic module 212, the similar KB article module 214, and the all similarity type module 216 may be located on one or more separate computing devices that are accessible by the system 200.

For example, the same CI module 208, the similar CI module 210, the similar topic module 212, the similar KB article module 214, and the all similarity type module 216 may each determine a list of historically similar incidents. These individual lists may then be filtered and combined by the natural language processing based platform 204. The same CI module 208, the similar CI module 210, the similar topic module 212, the similar KB article module 214, and the all similarity type module 216 may review and determine historical data within a certain time frame. For example, the modules may all search historical incident data that has occurred within the past year of the received incident data. In some examples, the date range for the historical data may be predefined (e.g., in the past month, year, two years, five years, decade, etc.). In some examples, a user may be able to enter a date range for the historical data to be examined. For example, the user may be able to enter that currently received incident data should only be compared to historical data received in the last six months.

For example, the same CI module 208 and the similar CI module 210 may determine similar historical incidents based on the configurable item name as associated with each interest (and more particularly the ID and the name). For these two modules, the natural language processing based platform 204 may search for similar incidents by determining related configurable items. The related configurable items and the incidents that occurred may be output and saved. In comparison, the similar topic module 212, the similar KB article module 214, and the all similarity type module 216 may determine similar incidents based on extracting and analyzing the summary text associated with each of the received incidents.

The natural language processing based platform 204 may include the same CI module 208. An incident may occur for a particular configurable item. The configurable item may refer to (1) a product; (2) an allocated component of a product, or (3) a system that satisfies an end use function, has distinct requirements, has functionality and/or product relationships, and is designated for distinct control in the configuration management system. When an incident occurs, it may occur for a particular configurable item. The same CI module 208 may be configured to, when a new incident occurs, review the configurable item's ID (also referred to as the sys_ID) of the new incident and compare the configurable item's ID of the new incident to all historical incidents and their corresponding configurable item IDs (e.g., the CI_ID metadata associated with each historical incident). A matching algorithm may be applied to determine all past configurable items with the same IDs. This list of matching IDs and corresponding configurable items and their corresponding incidents may be saved (e.g., to the one or more storage devices 218). Further, when saved, it may be recorded that the matching ID's are saved.

FIG. 5A depicts an exemplary table 502 output from a same CI module 208, according to one or more embodiments. As shown, the exemplary ID number (depicted as the CMDB_CI) may be identical for the three configurable items determined. These three configurable items may be stored for future output.

The natural language processing based platform 204 may include a similar CI module 210. The similar CI module 210 may extract the "CI Name" of a configurable item for the received incident and compare this to the CI Names of all historical incidents and their corresponding configurable items. For example, the similar CI module 210 may utilize natural language processing (NLP) techniques to determine the similar CI Name. For example, a text matching algorithm may extract all past incidents' configurable item names and compare the past names to the configurable item name for the received incident. For example, a regular expression (Regex), tokenization, and/or fuzzy keyword algorithms may also be applied to determine similar "CI Names" for the configurable items from the received incidents as compared to the historical incidents. This list may represent names that are slight variations of the searched for name. For example, if a configurable item's name is "e-banking," these algorithms may search for and determine configurable item names such as "E-banking," "e banking," and/or "electronic banking." The determined list may then be saved (e.g., to the one or more storage devices 218).

FIG. 5B depicts an exemplary table 504 output from a similar CI module 210, according to one or more embodiments. As shown, if an exemplary incident occurs for a configurable item A, the configurable item A may have the name "APP ACB PRD ACB ACBS-CBS." The similar CI module 210 may determine (e.g., by using a fuzzy algorithm) the two listed configurable items including the names "ACBS API" and "App ACB PRD ACB ACBS-CIBU." These configurable items and their corresponding incidents may then be extracted and stored for later output.

Figure 3:
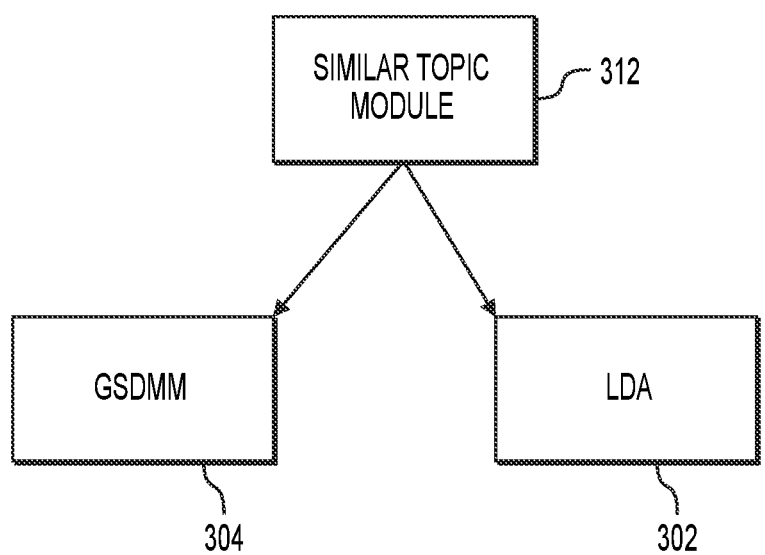
FIG. 3 depicts an exemplary block diagram of a similar topic module, according to one or more embodiments.

The natural language processing based platform 204 may include similar topic module 212. The similar topic module 212 may compare the summary/description associated with an incident and compare this with the summary/description of the historical incidents. For example, the similar topic module 212 may utilize a Natural Language Processing (NLP) model that categorizes each of the incidents' text summaries into a predefined number of topics. The NLP model may utilize linear discriminant analysis (LDA) 302 (as depicted in FIG. 3) and/or Gibbs Sampling Dirichlet Mixture Model (GSDMM) 304 (as depicted in FIG. 3) to determine the topics for the received incident. Both the LDA 302 and GSDMM 304 may be unsupervised models that are trained to fetch topics from the descriptions of the incidents (e.g., from the short descriptions). The similar topic module 212 may for example determine natural groups of topics that may not be externally grouped together.

The LDA 302 may, for example, be preferred for longer text descriptions. The LDA 302 may recognize that each text description is filled with a distribution of topics and that each topic may encompass a distribution of words. The LDA 302 may return a probability distribution of each topic's percentage contribution to the document (e.g., 0.3*Topic_1, 0.7*topic_2).

The GSDMM 304 may be an "extended LDA algorithm." The GSDMM 304 may by preferred on incidents with text descriptions of shorter length (e.g., less than 100 characters of text). The GSDMM 304 may for example only deal with a single topic (as opposed to the LDA 302 utilized to determine multiple topics).

All the new incoming incidents (e.g., incidents received at the data ingestion tool 202) may then be clustered using either the LDA 302 or the GSDMM 304 of the similar topic module 212. These algorithms may for example be performed by the background scheduler (e.g., a workflow management platform such as, e.g., Apache Airflow), which may be implemented by the system 200 described herein. The determined topics may be referred to as topic clusters. Each received incident may be grouped into one or more determined topic clusters. The topic clusters may be created once a set amount of data is received (e.g., after a set amount of incident data is received by the system). For example, the topic clusters may be determined after a set amount of data is received, and after set periods of time or set amounts of incidents received, the model may be retrained, creating new topic clusters. The group of identified clustered incidents may be ranked based on similarity score applied on each text description of a historical incident. Using a cut off value, the top highest similarity scored records may be returned via an API. The similar topic module 212 may thus output and save all historical incidents having the same topic cluster associated with the received incident.

FIGS. 5C and 5D may for example be tables 506 and 508 output from a similar CI module 210, according to one or more embodiments. In FIG. 5C, the description for an incident may be "1254: 'GP4/CP2-EMEA-SBK-SBK_FRCS BIM is missing the KPI as the L-OVNT-SBK-DA-FFFPFL is stuck." This description may then be analyzed by the similar CI module 210 and assigned to a particular topic. FIG. 5C includes a list of relevant incidents that were assigned to the same topic. FIG. 5C shows a list of determined incidents assigned to the same topic (e.g., the list of 7 historically similar incidents shown in the table of 5C).

In FIG. 5D, the description for an incident may include the phrase "observing some latency between the EPS boxes and the Lune EFTS number:" This description was then analyzed by the similar CI module 210 and assigned to a particular topic. FIG. 5D includes a list of the relevant incidents that were assigned to the same topic. FIG. 5D displays an example of an alternative description and the assigned list of incidents with a similarly determined topic.

The natural language processing based platform 204 may include similar KB article module 214. When a new major incident is detected, a knowledge base (KB) article may be created corresponding to that incident which has incident related report. This KB article may be generated automatically by the internal system related to the incident. The KB article may include a recommendation based on the particular incident. When a KB article is given in response to an incident, a user may further have the option to assign a rating based on how useful the suggested KB article is. This may be referred to as the KB article rating. The KB article rating and KB article itself may be received as input into the KB article module 214.

The similar KB article module 214 may utilize machine learning techniques to extract any listed KB articles from a particular incident. For example, a NLP may extract a KB article from a description of an incident. The KB article module 214 may have extracted KB articles from all historical incidents. If a KB article for a new incident is determined to match either by a fuzzy algorithm or an exact match algorithm, to a historical incident, then the historical incident may be saved/output.

FIG. 5E, may for example be a table output from a similar KB module 214, according to one or more embodiments. The short description of an exemplary input incident "A" may be displayed above the table. This short description of incident A may include a "KB article." The KB module 214 may have extracted the "KB article" from the short description such as "GP4/CP2." FIG. 5E may display a list of extracted incidents from the KB module 214 that may include the same KB article within their respective short descriptions as incident A.

The natural language processing based platform 204 may include an all similarity type module 216. The all similarity type module 216 may be configured to combine all extracted incidents from the same CI module 208, the similar CI module 210, the similarity topic module 212, and the similar KB article module 214, and to rank and output a final list or related historical incidents (e.g., by the output interface 206). The all similarity type module 216 may first receive and store the lists and incidents within each list from all modules (e.g., same CI module 208, the similar CI module 210, the similarity topic module 212, and the similar KB article module 214). In some examples, some of the other modules may output a list with no historical incidents (e.g., the similar KB article module 214 may determine that no other historical incidents had the same/similar KB article).

For example, the all similarity type module 216 may assign weighted scores to incidents from each received module. For example, incidents outputted by particular modules (e.g., by the same CI module 208, the similar CI module 210, the similar topic module 212, and/or the similar KB article module 214) may be assigned a higher weight score for their particular determined historical incidents. In particular, scores of weighted sums may be applied to each incident identified by the following modules: the same CI module 208, the similar CI module 210, the similar topic module 212, and/or the similar KB article module 214. For example, a particular weight may be applied to each incident identified by a particular module. This particular weight may be referred to as an initial weight. The all similarity type module 216 may develop a list of all incidents determined by the same CI module 208, the similar CI module 210, the similar topic module 212, and/or the similar KB article module 214. Incidents determined by more than one of the modules may be identified. An initial weighted score computation may be performed on the list of all incidents. For example, an initial weighted score may be assigned to each incident, depending on what module identified the incident.

Next, a weighted average score may be determined for each identified incident. If only a single module identified the incident, then the initial weighted score may be weighted average score. If more than one module determined a particular identified incident, then the average weighted score may be a combination of initial weighted scores assigned to the incident. For example, the average weighted score can be a combination of the initial weighted scores. For example, the average weighted score may be determined by multiplying an assigned multiplier to the initial scores, and the scores may be combined (e.g., weighted average score=SUM (inc_score*initial weighted score)).

For example, if multiple modules identified a single incident, then multiple initial weights may be applied to a single incident. For example, if the same CI module 208 and the similar topic module 212 identified the same incident A, then incident A may be assigned two initial weighted scores based on the identifying modules. For example, an initial weighted score of 10 may be applied based on the same CI module 208 identifying the incident A and another initial weighted score of 40 may be applied based on the similar topic module 212 identifying the incident A. The single incident A may then have the scores combined to determine a weighted average score, so the exemplary incident may have an average weighted score of 50.

FIG. 6 depicts an exemplary table 600 of weighted scores output from an all similarity type module 216, according to one or more embodiments. The chart 600 depicts an exemplary weight assignment for each of the modules including the same CI module 208, the similar CI module 210, the similarity topic module 212, and the similar KB article module 214. For example, historical incidents determined by the same CI module may be assigned a weight of 10, historical incidents determined by the similar CI module 210 may be assigned a weight of 5, historical incidents determined by the similar topic module 212 may be assigned a weight of 45, and historical incidents determined by the similar KB article module 214 may be assigned a score of 40. A user may be able to access and adjust the weighting of the different modules as needed.

FIG. 7 depicts an exemplary table 700 output from an all similarity type module 216, according to one or more embodiments. For example, the all similarity type module 216 may first extract and compile all lists determined by the same CI module 208, the similar CI module 210, the similarity topic module 212, and the similar KB article module 214. Next, the all similarity type module 216 may combine the lists and assign the particular module (e.g., same CI module 208, the similar CI module 210, the similarity topic module 212, and the similar KB article module 214) that determined the incident to the database (as depicted in column 702). In some examples, multiple modules may determine the same historical incident. In these cases, multiple modules may be listed in column 702. Last, the assigned weight for each incident may be determined by the all similarity type module 216. The all similarity type module 216 may, based on each module's assigned weight, assign a score to the received historical incident. If an item of the list was determined by multiple modules, then multiple weights may be included for the particular historical incident. For example, if both the similar CI module 210 and the similar KB article module 214 determined the same historical incident, then the assigned weight for both modules would be added for the particular incident. This combined weight may also be referred to as a final score as shown in FIG. 7 column 704. The all similarity type module 216 may then determine a final list, where the list of historical incidents is ranked based on the combined weight determined. This list may then be output to an output interface 206.

The output interface 206 may include an application programming integrate (API) configured to export the determined historically similar incident list (e.g., determined by the all similarity type module 216). For example, this may be output by an electronic network, such as the Internet, through one or more computers, servers, and/or handheld mobile devices. A user may then access the determined list through a computing device (e.g., the computing device 900). The output interface 206 may also be configured to output charts (e.g., exemplary charts 502, 504, 506, 508 and 510) of historical lists determined by individual modules of the natural language processing based platform 204.

Figure 4:
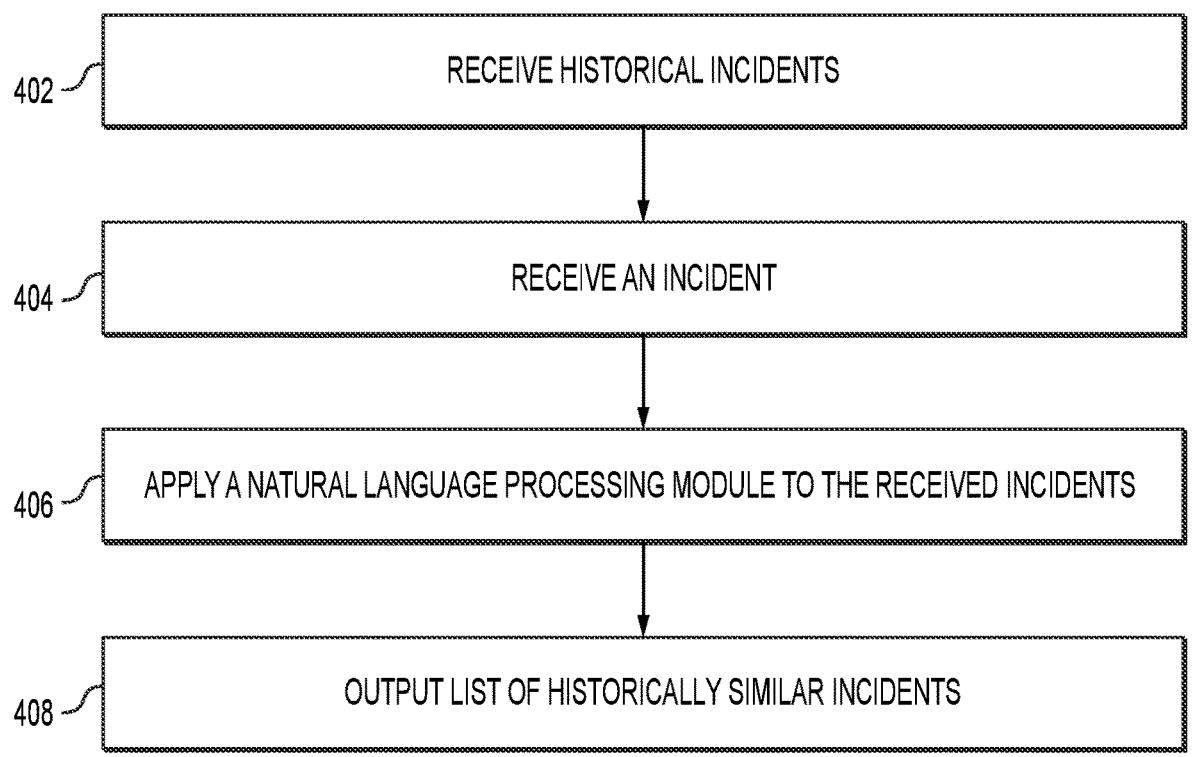
FIG. 4 depicts an exemplary flowchart of how incident data may be received and processed to determine historically similar incidents in a system, according to one or more embodiments.

FIG. 4 depicts an exemplary flowchart of how data may be processed by a natural language processing model to determine historically similar incidents in a system, according to one or more embodiments. The process described in FIG. 4 may be implemented by the data pipeline system 100 of FIG. 1 and/or by the system 200 of FIG. 2.

At step 402, historical incident data (e.g., historical data objects indicating occurrences of previous incidents) of one or more systems may be received. Incident data (both historical and new incident data) may include incident reports with information for each incident provided with one or more of an incident number, closed date/time, category, close code, close note, long description, short description, root cause, or assignment group. Incident data may include incident reports with information for each incident provided with one or more of an issue key, description, summary, label, issue type, fix version, environment, author, or comments. Incident data may include incident reports with information for each incident provided with one or more of a file name, script name, script type, script description, display identifier, message, committer type, committer link, properties, file changes, or branch information. Incident data may include one or more of real-time data, market data, performance data, historical data, utilization data, infrastructure data, or security data. For example, within incident reports may be the following data: configuration management database configuration item (cmdb_ci) ID, a cmdb_CI name, and associated knowledge base (KB) article with each incident. In some examples, a single incident may include multiple CI's attached to a single incident. These are merely examples of information that may be used as data, and the disclosure is not limited to these examples.

The historical incident data may be received for a set period of time. For example, the historical incident data may be uploaded in bulk (e.g., saved incident data for a system may be uploaded for a set period such as the past month, past year, past decade, etc.). Further, as new incidents occur, this information may be saved and become historical incident data for future uses of a system.

At step 404, new incident data (e.g., a data object indicating an occurrence of a current incident) may be received. This incident data may be analyzed by the systems and methods described herein (e.g., system 200) to determine historically similar incident data. For example, new incident data may be generated automatically by an external system by monitoring tools that generate alerts and incident data to provide notification of high-risk actions and failures in IT environment. Incident data may be generated as tickets (e.g., tickets capable of being received by the system 200). For example, the incident and its corresponding data received at step 404 may be compared to all historical incidents and their corresponding data received at step 402. The Incident data may be generated automatically by monitoring tools that generate alerts and incident data to provide notification of high-risk actions, failures in IT environment, and may be generated as tickets. This may then be transferred to the system described herein (e.g., system 300).

At step 406, the system (e.g., system 200) may apply one or more natural language processing modules (e.g., same CI module 208, the similar CI module 210, the similar topic module 212, the similar KB article module 214) to determine a list of historically similar incidents. The system may further compile the initially determined list into a single list (e.g., by the all similarity type module 216). This compiled list may further be weighted and ranked based on which initial module(s) (e.g., same CI module 208, the similar CI module 210, the similar topic module 212, the similar KB article module 214) determined the historical incident.

At step 408, the ranked list may be output to one or more users. This list may be utilized for further analysis of an initially received incident. For example, the list may be fed an external system for further processing or to an individual (e.g., an IT specialist analyzing the initially received incident).

Figure 8:
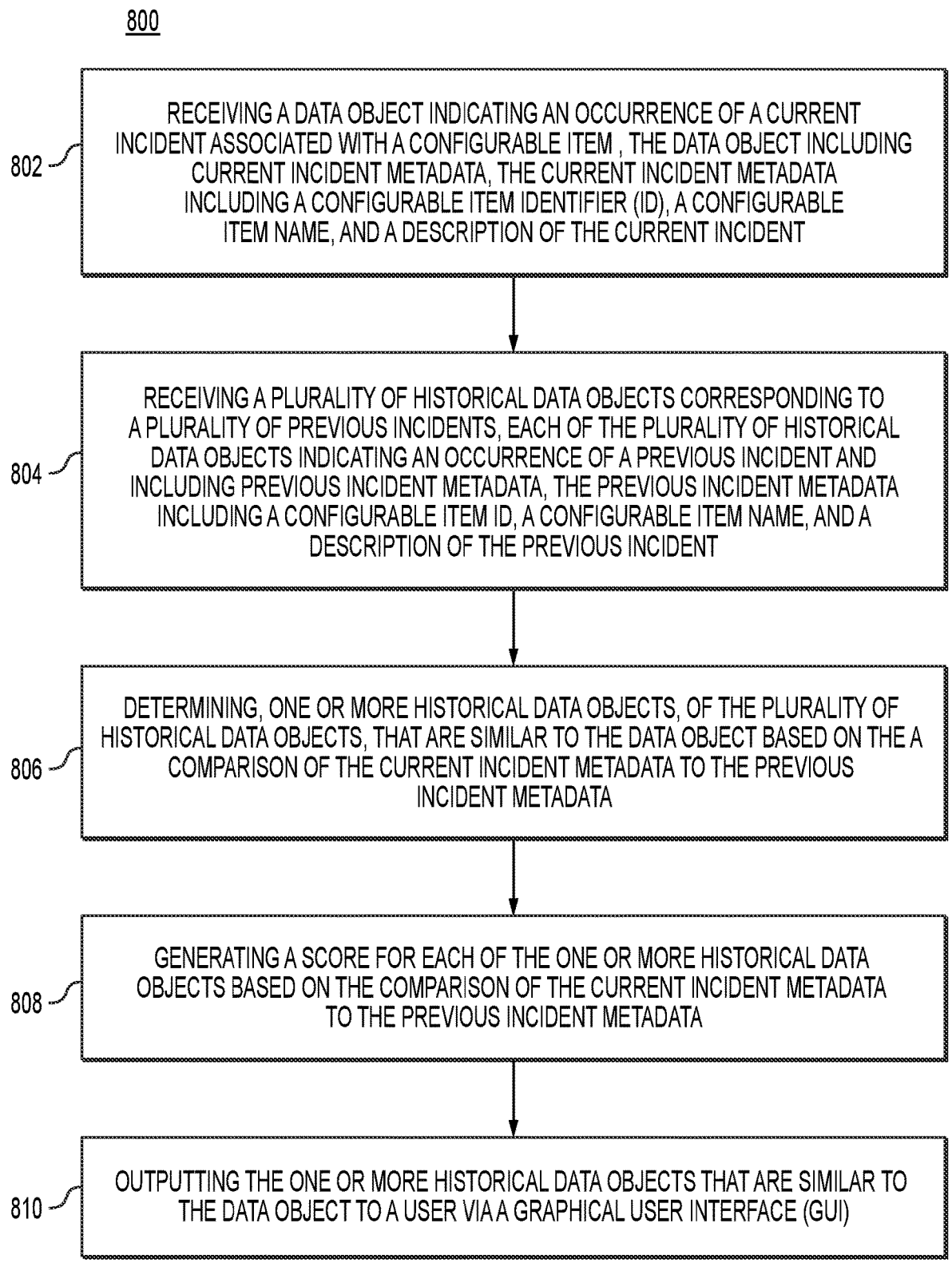
FIG. 8 depicts a flowchart for determining historically similar incidents, according to one or more embodiments.

FIG. 8 depicts a flowchart 800 for determining historically similar incidents, according to one or more embodiments.

At step 802, a data object indicating an occurrence of a current incident associated with a configurable item may be received (e.g., by the natural language processing based platform 204), the data object including current incident metadata, the current incident metadata including a configurable item identifier (ID), a configurable item name, and a description of the current incident.

At step 804, a plurality of historical data objects corresponding to a plurality of previous incidents may be received (e.g. by the natural language processing based platform 204), each of the plurality of historical data objects indicating an occurrence of a previous incident and including previous incident metadata, the previous incident metadata including a configurable item ID, a configurable item name, and a description of the previous incident. The plurality of historical data objects may be received during a pre-determined time period. A knowledge based (KB) article and a topic may be extracted from each of the descriptions of the current and previous incidents using a natural language processing module. The natural language processing module may utilize a linear discriminant analysis algorithm or Gibbs sampling dirichlet mixture model algorithm to extract the topic.

At step 806, one or more historical data objects, of the plurality of historical data objects, that are similar to the data object may be determined based on a comparison of the current incident metadata to the previous incident metadata. Determining the one or more historical data objects may further include applying a natural language processing algorithm to the data object and the plurality of historical data objects.

At step 808, a score for each of the one or more historical data objects may be generated based on the comparison of the current incident metadata to the previous incident metadata. Generating the score for each of the one or more historical data objects may include: determining a first list of historical data objects based on a similarity between the configurable item ID of the current incident and the configurable item ID of each of the previous incidents; determining a second list of historical data objects based on a similarity between the configurable item name of the current incident and the configurable item name of each of the previous incidents; determining a third list of historical data objects based on a similarity between the topic of the current incident and the topic of each of the previous incidents; and determining a fourth list of historical data objects based on a similarity between the KB article of the current incident and the KB article of each of the previous incidents. Generating the score for each of the one or more historical data objects may include assigning one or more initial scores to each of the one or more historical data objects based on whether the historical data object was determined to be in the first list, second list, third list, and/or fourth list. Generating the score for each of the one or more historical data objects may include assigning a weighted average score to each of the one or more historical data objects, wherein the weighted average score is an initial score if the historical data object is only in one of the first list, second list, third list, and fourth list and the weighted average score is based on a combination of initial scores when the historical data object is in two or more of the first list, second list, third list, and fourth list, the weighted average score being the score generated for each of the one or more historical data objects. The one or more historical data objects may be included in a ranked list that combines the first list, second list, third list, and fourth list, and orders the one or more historical data objects based on the respective one or more weighted average scores.

At step 810, the one or more historical data objects that are similar to the data object may be output to a user via a graphical user interface (GUI) (e.g., by the output interface 206).

Figure 9:
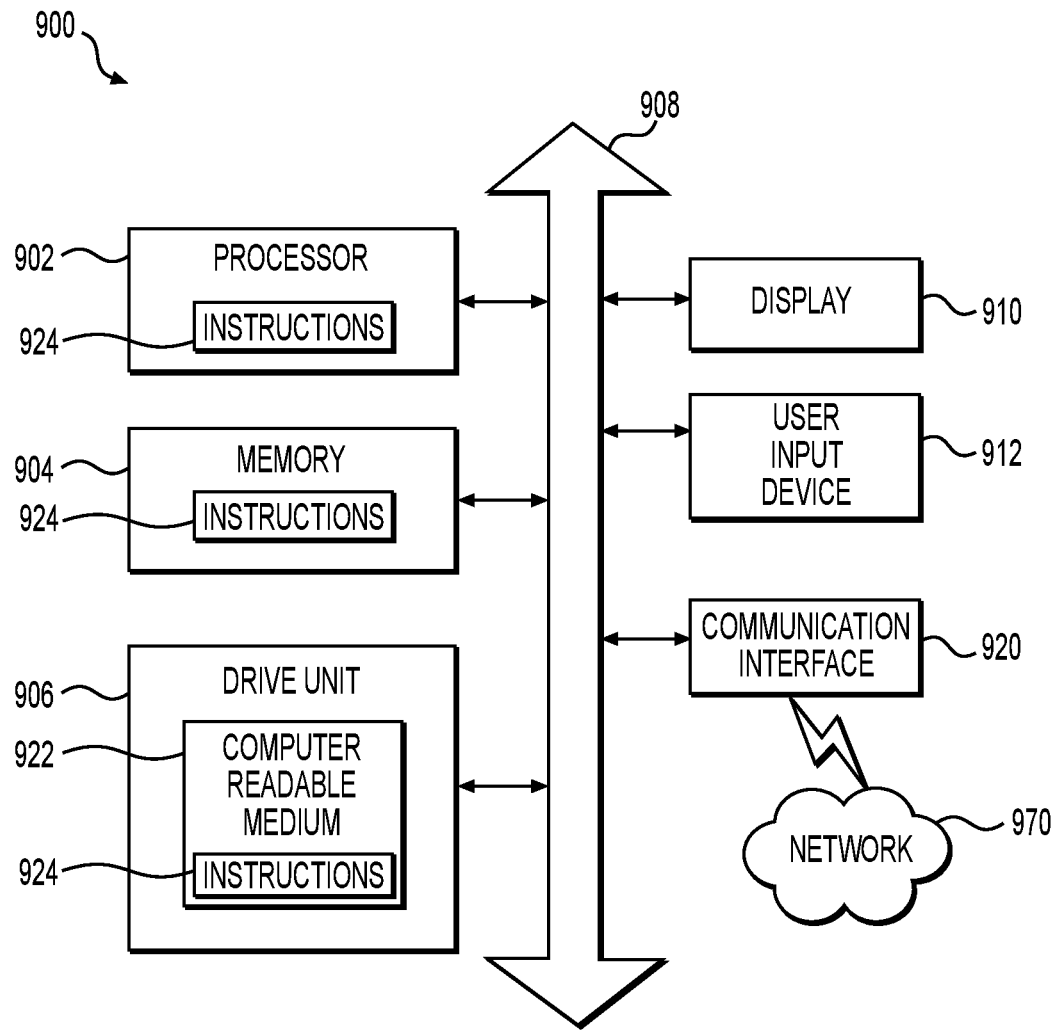
FIG. 9 illustrates a computer system for executing the techniques described herein, according to one or more embodiments of the present disclosure.

FIG. 9 illustrates a computer system 900 for executing the techniques described herein, according to one or more embodiments of the present disclosure.

In addition to a standard desktop, or server, it is fully within the scope of this disclosure that any computer system capable of the required storage and processing demands would be suitable for practicing the embodiments of the present disclosure. This may include tablet devices, smart phones, pin pad devices, and any other computer devices, whether mobile or even distributed on a network (i.e., cloud based).

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," a "computing platform," a "computing device," or a "server" may include one or more processors.

FIG. 9 illustrates a computer system designated 900. The computer system 900 can include a set of instructions that can be executed to cause the computer system 900 to perform any one or more of the methods or computer based functions disclosed herein. The computer system 900 may operate as a standalone device or may be connected, e.g., using a network, to other computer systems or peripheral devices.

In a networked deployment, the computer system 900 may operate in the capacity of a server or as a client user computer in a server-client user network environment, or as a peer computer system in a peer-to-peer (or distributed) network environment. The computer system 900 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 900 can be implemented using electronic devices that provide voice, video, or data communication. Further, while a single computer system 900 is illustrated, the term "system" shall also be taken to include any collection of systems or sub-systems that individually or jointly execute a set, or multiple sets, of instructions to perform one or more computer functions.

As illustrated in FIG. 9, the computer system 900 may include a processor 902, e.g., a central processing unit (CPU), a graphics processing unit (GPU), or both. The processor 902 may be a component in a variety of systems. For example, the processor 902 may be part of a standard personal computer or a workstation. The processor 902 may be one or more general processors, digital signal processors, application specific integrated circuits, field programmable gate arrays, servers, networks, digital circuits, analog circuits, combinations thereof, or other now known or later developed devices for analyzing and processing data. The processor 902 may implement a software program, such as code generated manually (i.e., programmed).

The computer system 900 may include a memory 904 that can communicate via a bus 908. The memory 904 may be a main memory, a static memory, or a dynamic memory. The memory 904 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 904 includes a cache or random-access memory for the processor 902. In alternative implementations, the memory 904 is separate from the processor 902, such as a cache memory of a processor, the system memory, or other memory. The memory 904 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 904 is operable to store instructions executable by the processor 902. The functions, acts or tasks illustrated in the figures or described herein may be performed by the programmed processor 902 executing the instructions stored in the memory 904. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel payment and the like.

As shown, the computer system 900 may further include a display unit 910, such as a liquid crystal display (LCD), an organic light emitting diode (OLED), a flat panel display, a solid-state display, a cathode ray tube (CRT), a projector, a printer or other now known or later developed display device for outputting determined information. The display 910 may act as an interface for the user to see the functioning of the processor 902, or specifically as an interface with the software stored in the memory 904 or in the drive unit 906.

Additionally or alternatively, the computer system 900 may include an input device 912 configured to allow a user to interact with any of the components of system 900. The input device 912 may be a number pad, a keyboard, or a cursor control device, such as a mouse, or a joystick, touch screen display, remote control, or any other device operative to interact with the computer system 900.

The computer system 900 may also or alternatively include a disk or optical drive unit 906. The disk drive unit 906 may include a computer-readable medium 922 in which one or more sets of instructions 924, e.g., software, can be embedded. Further, the instructions 924 may embody one or more of the methods or logic as described herein. The instructions 924 may reside completely or partially within the memory 904 and/or within the processor 902 during execution by the computer system 900. The memory 904 and the processor 902 also may include computer-readable media as discussed above.

In some systems, a computer-readable medium 922 includes instructions 924 or receives and executes instructions 924 responsive to a propagated signal so that a device connected to a network 970 can communicate voice, video, audio, images, or any other data over the network 970. Further, the instructions 924 may be transmitted or received over the network 970 via a communication port or interface 920, and/or using a bus 908. The communication port or interface 920 may be a part of the processor 902 or may be a separate component. The communication port 920 may be created in software or may be a physical connection in hardware. The communication port 920 may be configured to connect with a network 970, external media, the display 910, or any other components in system 900, or combinations thereof. The connection with the network 970 may be a physical connection, such as a wired Ethernet connection or may be established wirelessly as discussed below. Likewise, the additional connections with other components of the system 900 may be physical connections or may be established wirelessly. The network 970 may alternatively be directly connected to the bus 908.

While the computer-readable medium 922 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 922 may be non-transitory, and may be tangible.

The computer-readable medium 922 can include a solid-state memory such as a memory card or other package that houses one or more non-volatile read-only memories. The computer-readable medium 922 can be a random-access memory or other volatile re-writable memory. Additionally or alternatively, the computer-readable medium 922 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 900 may be connected to one or more networks 970. The network 970 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 970 may include wide area networks (WAN), such as the Internet, local area networks (LAN), campus area networks, metropolitan area networks, a direct connection such as through a Universal Serial Bus (USB) port, or any other networks that may allow for data communication. The network 970 may be configured to couple one computing device to another computing device to enable communication of data between the devices. The network 970 may generally be enabled to employ any form of machine-readable media for communicating information from one device to another. The network 970 may include communication methods by which information may travel between computing devices. The network 970 may be divided into sub-networks. The sub-networks may allow access to all of the other components connected thereto or the sub-networks may restrict access between the components. The network 970 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel payment. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP, etc.) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosed embodiments are not limited to any particular implementation or programming technique and that the disclosed embodiments may be implemented using any appropriate techniques for implementing the functionality described herein. The disclosed embodiments are not limited to any particular programming language or operating system.

It should be appreciated that in the above description of exemplary embodiments, various features of the embodiments are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that a claimed embodiment requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment.

Furthermore, while some embodiments described herein include some but not other features included in other embodiments, combinations of features of different embodiments are meant to be within the scope of the present disclosure, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the function.

In the description provided herein, numerous specific details are set forth. However, it is understood that embodiments of the present disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the present disclosure, those skilled in the art will recognize that other and further modifications may be made thereto without departing from the spirit of the present disclosure, and it is intended to claim all such changes and modifications as falling within the scope of the present disclosure. For example, any formulas given above are merely representative of procedures that may be used. Functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method for finding historically similar incidents in a system, the method comprising:
   receiving a data object indicating an occurrence of a current incident associated with a configurable item, the data object including current incident metadata, the current incident metadata including a configurable item identifier (ID), a configurable item name, and a description of the current incident;
   receiving a plurality of historical data objects corresponding to a plurality of previous incidents, each of the plurality of historical data objects indicating an occurrence of a previous incident and including previous incident metadata, the previous incident metadata including a configurable item ID, a configurable item name, and a description of the previous incident;
   determining one or more historical data objects, of the plurality of historical data objects, that are similar to the data object based on a comparison of the current incident metadata to the previous incident metadata, wherein the one or more historical data objects include a plurality of lists of historical data object, each list corresponding to a particular metadata association, wherein each list is determined by a particular current incident metadata's similarity to the corresponding metadata of the historical incident metadata;
   generating a score for each of the one or more historical data objects based on the comparison of the current incident metadata to the previous incident metadata; and
   outputting the one or more historical data objects that are similar to the data object to a user via a graphical user interface (GUI).

2. The computer-implement method of claim 1, wherein determining the one or more historical data objects further comprises applying a natural language processing algorithm to the data object and the plurality of historical data objects.

3. The computer-implemented method of claim 1, wherein the plurality of historical data objects are received during a pre-determined time period.

4. The computer-implemented method of claim 1, further comprising:
   extracting a knowledge based (KB) article and a topic from each of the descriptions of the current and previous incidents using a natural language processing module.

5. The computer-implemented method of claim 4, wherein the natural language processing module utilizes a linear discriminant analysis algorithm or Gibbs sampling dirichlet mixture model algorithm to extract the topic.

6. The computer-implemented method of claim 5, wherein determining one or more historical data objects, of the plurality of historical data objects, that are similar to the data object based on a comparison of the current incident metadata to the previous incident metadata comprises:
   determining a first list of historical data objects based on a similarity between the configurable item ID of the current incident and the configurable item ID of each of the previous incidents;
   determining a second list of historical data objects based on a similarity between the configurable item name of the current incident and the configurable item name of each of the previous incidents;
   determining a third list of historical data objects based on a similarity between the topic of the current incident and the topic of each of the previous incidents; and
   determining a fourth list of historical data objects based on a similarity between the KB article of the current incident and the KB article of each of the previous incidents.

7. The computer-implemented method of claim 6, wherein generating the score for each of the one or more historical data objects further comprises:
   assigning one or more initial scores to each of the one or more historical data objects based on whether the historical data object was determined to be in the first list, second list, third list, and/or fourth list.

8. The computer-implemented method of claim 7, wherein generating the score for each of the one or more historical data objects further comprises:
   assigning a weighted average score to each of the one or more historical data objects, wherein the weighted average score is an initial score if the historical data object is only in one of the first list, second list, third list, and fourth list and the weighted average score is based on a combination of initial scores when the historical data object is in two or more of the first list, second list, third list, and fourth list, the weighted average score being the score generated for each of the one or more historical data objects.

9. The computer-implemented method of claim 8, wherein the one or more historical data objects are included in a ranked list that combines the first list, second list, third list, and fourth list, and orders the one or more historical data objects based on the respective one or more weighted average scores.

10. A system for finding historically similar incidents in a system, the system comprising:
a memory having processor-readable instructions stored therein; and
at least one processor configured to access the memory and execute the processor-readable instructions to perform operations including:
receiving a data object indicating an occurrence of a current incident associated with a configurable item, the data object including current incident metadata, the current incident metadata including a configurable item identifier (ID), a configurable item name, and a description of the current incident;
receiving a plurality of historical data objects corresponding to a plurality of previous incidents, each of the plurality of historical data objects indicating an occurrence of a previous incident and including previous incident metadata, the previous incident metadata including a configurable item ID, a configurable item name, and a description of the previous incident;
determining one or more historical data objects, of the plurality of historical data objects, that are similar to the data object based on a comparison of the current incident metadata to the previous incident metadata, wherein the one or more historical data objects include a plurality of lists of historical data object, each list corresponding to a particular metadata association, wherein each list is determined by a particular current incident metadata's similarity to the corresponding metadata of the historical incident metadata;
generating a score for each of the one or more historical data objects based on the comparison of the current incident metadata to the previous incident metadata; and
outputting the one or more historical data objects that are similar to the data object to a user via a graphical user interface (GUI).

11. The system of claim 10, wherein determining the one or more historical data objects further comprises applying a natural language processing algorithm to the data object and the plurality of historical data objects.

12. The system of claim 10, wherein the plurality of historical data objects are received during a pre-determined time period.

13. The system of claim 10, further comprising:
extracting a knowledge based (KB) article and a topic from each of the descriptions of the current and previous incidents using a natural language processing module.

14. The system of claim 13, wherein the natural language processing module utilizes a linear discriminant analysis algorithm or Gibbs sampling dirichlet mixture model algorithm to extract the topic.

15. The system of claim 14, wherein determining one or more historical data objects, of the plurality of historical data objects, that are similar to the data object based on a comparison of the current incident metadata to the previous incident metadata comprises:
determining a first list of historical data objects based on a similarity between the configurable item ID of the current incident and the configurable item ID of each of the previous incidents;
determining a second list of historical data objects based on a similarity between the configurable item name of the current incident and the configurable item name of each of the previous incidents;
determining a third list of historical data objects based on a similarity between the topic of the current incident and the topic of each of the previous incidents; and
determining a fourth list of historical data objects based on a similarity between the KB article of the current incident and the KB article of each of the previous incidents.

16. The system of claim 15, wherein generating the score for each of the one or more historical data objects further comprises:
assigning one or more initial scores to each of the one or more historical data objects based on whether the historical data object was determined to be in the first list, second list, third list, and/or fourth list.

17. The system of claim 16, wherein generating the score for each of the one or more historical data objects further comprises:
assigning a weighted average score to each of the one or more historical data objects, wherein the weighted average score is an initial score if the historical data object is only in one of the first list, second list, third list, and fourth list and the weighted average score is based on a combination of initial scores when the historical data object is in two or more of the first list, second list, third list, and fourth list, the weighted average score being the score generated for each of the one or more historical data objects.

18. The system of claim 17, wherein the one or more historical data objects are included in a ranked list that combines the first list, second list, third list, and fourth list, and orders the one or more historical data objects based on the respective one or more weighted average scores.

19. A non-transitory computer readable medium storing processor-readable instructions which, when executed by at least one processor, cause the at least one processor to perform operations including:
receiving a data object indicating an occurrence of a current incident associated with a configurable item, the data object including current incident metadata, the current incident metadata including a configurable item identifier (ID), a configurable item name, and a description of the current incident;
receiving a plurality of historical data objects corresponding to a plurality of previous incidents, each of the plurality of historical data objects indicating an occurrence of a previous incident and including previous incident metadata, the previous incident metadata including a configurable item ID, a configurable item name, and a description of the previous incident;
determining one or more historical data objects, of the plurality of historical data objects, that are similar to the data object based on a comparison of the current incident metadata to the previous incident metadata, wherein the one or more historical data objects include a plurality of lists of historical data object, each list corresponding to a particular metadata association, wherein each list is determined by a particular current incident metadata's similarity to the corresponding metadata of the historical incident metadata;

generating a score for each of the one or more historical data objects based on the comparison of the current incident metadata to the previous incident metadata; and outputting the one or more historical data objects that are similar to the data object to a user via a graphical user interface (GUI).

20. The non-transitory computer readable medium of claim 19, wherein determining the one or more historical data objects further comprises applying a natural language processing algorithm to the data object and the plurality of historical data objects.

* * * * *